May 10, 1932.  C. B. WILLIAMS  1,857,419
WINDSHIELD WIPER
Filed Nov. 26, 1929
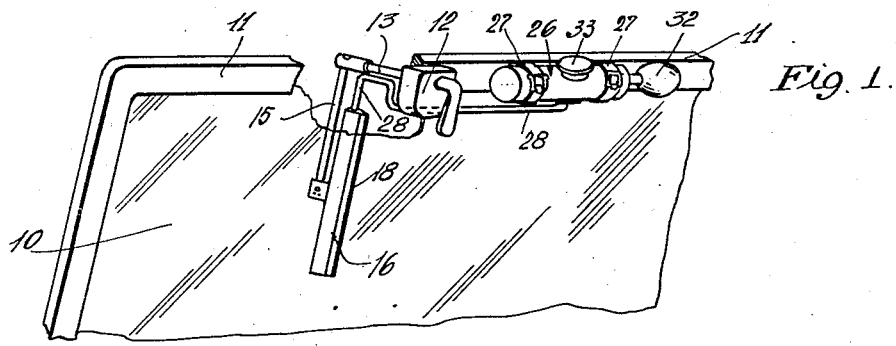
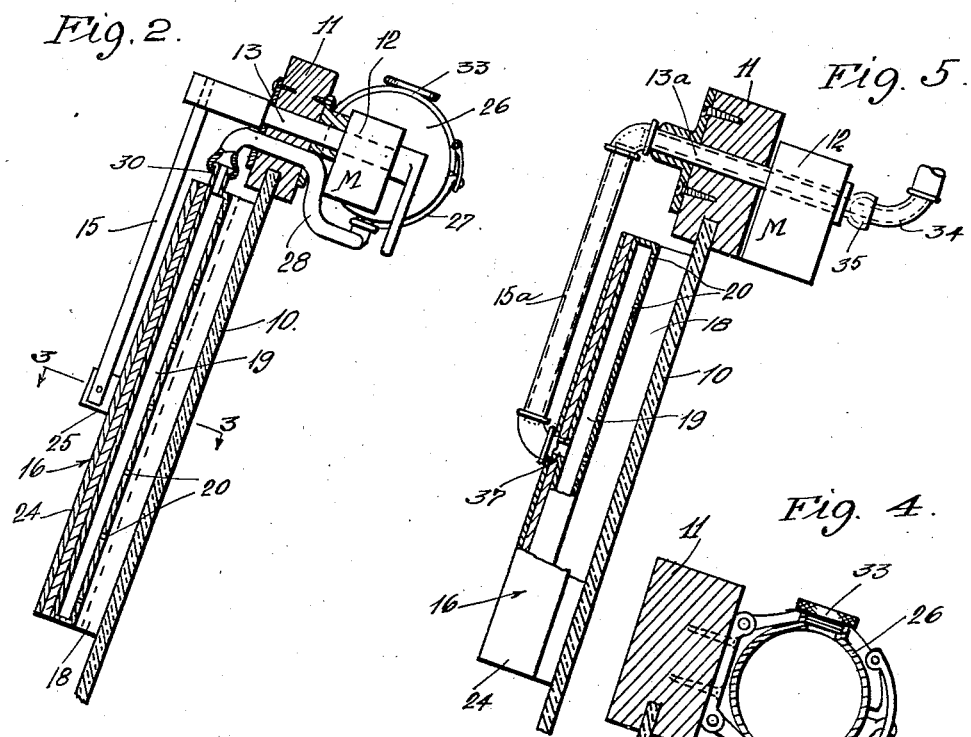
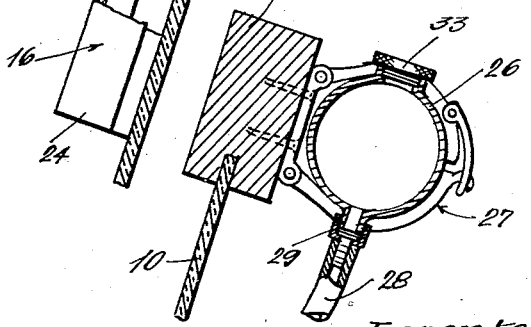
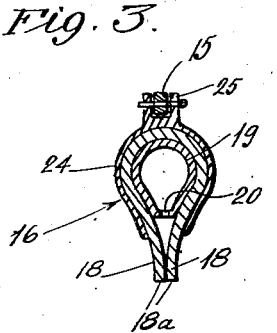
Inventor.
Clarence B. Williams
Attorney.

Patented May 10, 1932

1,857,419

UNITED STATES PATENT OFFICE

CLARENCE B. WILLIAMS, OF SANTA BARBARA, CALIFORNIA

WINDSHIELD WIPER

Application filed November 26, 1929. Serial No. 409,820.

This invention relates generally to windshield cleaners of the type embodying a wiper rubber adapted to be swept back and forth over a given area of the windshield glass for the purpose of removing drops of water therefrom during rainy or foggy weather; the primary object of the invention being to adapt such windshield cleaners to the purpose of cleaning the windshield of dirt and scum, fog, etc.

Such wipers as are referred to ordinarily have utility for clearing the vision through the windshield only when the windshield is clouded with moisture due to rain or heavy fog, and in their present form are not suitable for removing the dirt or scum which accumulates on the glass when such heavy moisture is not present.

As is well known, it often occurs during driving on the road that due to any one of a variety of causes the windshield may become coated with dirt to such an extent that vision is seriously impaired, this condition being especially dangerous during night driving when the coating on the windshield causes reflection of lights from the rear. This condition may be due, for instance, to driving over a very dusty road, to a short shower which streaks the windshield but does not wash it clean, or possibly to rusty water spattered on the glass from an overflowing boiling radiator.

In all such cases as these, it frequently occurs that no facilities are conveniently available for cleaning the glass so that the driver can proceed in safety.

It is therefore an object of the present invention to provide means in combination with a windshield cleaner of the general type referred to, whereby water or other cleaning fluid can be supplied to the wiper so that dirt and scum can easily and conveniently be removed from the windshield glass.

The preferred embodiment of my invention embodies a wiper comprising two layers of rubber adapted to be wiped across the windshield with their edges wiping the glass, and between which may be introduced a supply of water or other cleaning fluid which discharges on the glass to facilitate the cleaning operation. The cleaning fluid is supplied to the wiper through a tube from a supply tank, which is provided with a conveniently located means for forcing the fluid from the tank into the wiper.

Thus the invention is characterized in supplying cleaning fluid to a wiper; and the mechanism for moving the wiper may be of any desired character. Illustratively, I show the invention applied to a common type of oscillating wiper.

Various additional objects and features of the invention will appear and be more fully understood from the following detailed description of a present preferred embodiment thereof, reference for this purpose being had to the accompanying drawings, in which:

Fig. 1 shows in perspective a windshield equipped with a windshield wiper to which my invention has been applied;

Fig. 2 is a section taken through the windshield and windshield wiper;

Fig. 3 is a transverse section taken on line 3—3 of Fig. 2;

Fig. 4 is a transverse section taken through the supply tank; and

Fig. 5 is a view similar to Fig. 2 but showing a variational embodiment of the invention.

Referring now to the drawings, the numeral 10 designates a windshield glass having at its upper edge a supporting frame 11. The motor case 12 of the windshield wiper is mounted in the present instance on the inner side of frame 11, and a shaft 13 reciprocatingly driven by the motor within case 12 extends through frame 11 and carries at its outer end a swinging arm 15, which in turn carries the wiper 16 at its free end, as usual.

The wiper 16 (see Fig. 3) as embodied according to the present invention comprises essentially a pair of adjacent rubber wiper leaves or layers 18 providing a pair of wiping edges 18a adapted to rub or scrape against the windshield glass, and a fluid discharge tube 19 located between the rubber leaves and having a line of perforations 20 through which cleaning fluid is adapted to be discharged, this fluid flowing out between the edges of the wiper members and being spread on the windshield glass, where it softens the dirt thereon so that it will be removed by the wiper. Because the rubber edges are normally in contact or closely spaced, the liquid stream emerging therefrom is spread out along the length of the wiper so that it supplies a uniform stream of liquid to the glass.

In the form illustrated, the wiper is essembled by wrapping a suitable sheet of rubber or the like about the discharge tube and holding it in place by means of a holder or clamp member 24, the two longitudinal edges of the rubber member extending out of the holder to form the adjacent wiping edges 18a. The holder 24 is provided near its middle with ears 25 adapted for pivotal attachment to the end of the swinging driving arm 15, as clearly shown in Fig. 2.

Mounted preferably on the inside of windshield frame 11 is a supply tank 26 for the cleaning fluid to be used in the windshield wiper. This tank is preferably mounted in releasable clamps 27 so that the tank can if desired be removed from the windshield for convenience in refilling, and is provided with a screw cap 33. A flexible delivery tube 28 is detachably connected to the bottom of tank 26, as at 29, and leads through an opening in the windshield frame to a nipple 30 communicating with the discharge tube 19. This tube is made flexible in the present embodiment because of the fact that the nipple 30 to which it attaches is movable with the swinging wiper. A rubber hand-bulb 32 is attached to tank 26 for the purpose of forcing fluid from the tank down into the discharge tube 19 and out of the perforations 20 therein when it is desired to clean the windshield glass.

The operation of the device will be obvious. When it is desired to clean the windshield, the wiper is driven in the usual manner, either manually or by means of the wiper motor, and bulb 32 is squeezed to force the cleaning fluid from the tank into tube 19 and out of the perforations 20. This cleaning fluid is then spread on the windshield glass by the edges of the wiper rubber, and softens the dirt thereon so that it is easily and effectively removed by the wiper.

In Fig. 5 is shown an embodiment of my invention in which the cleaning fluid is delivered to the discharge tube 19 through the driving arm 15a, which in this case is made hollow. In this embodiment the tube 34 from the supply tank is connected through a swivel 35 to a hollow shaft 13a passing through windshield frame 11 and driven as by the usual wiper motor in the motor case 12. The outer end of hollow shaft 13a is connected to the hollow swinging arm 15a, which in turn is connected to a nipple 37 extending through the back of the holder 24 from the middle of the discharge tube 19, shown in Fig. 5. In this case the swinging arm 15a serves both as a driving support for the wiper and as a conduit for supplying the cleaning fluid to the tube 19. The form illustrated in Fig. 2 is suitable when my invention is to be applied to existing windshield wipers, while the form shown in Fig. 5 may be preferable when my invention is originally incorporated in the design of the windshield wiper.

It will now be seen that I have provided an extremely simple attachment for a windshield wiper by means of which the windshield may easily and conveniently be cleaned of dirt in dry weather, and that this operation may be accomplished on the road without the inconvenience of getting out of the car to reach the front surface of the glass.

It will be understood the drawings and description are to be considered merely as illustrative of and not restrictive on the broader claims appended hereto, for various changes in design, structure and arrangement may be made without departing from the spirit and scope of said claims.

I claim:

1. A windshield cleaner comprising a double wiper member of rubber or the like, the double sides of which touch one another and present a pair of adjacent scrubbing edges, a liquid tube having an outlet between said double sides, and a holder holding said wiper member and liquid tube in assembly.

2. A windshield cleaner comprising a liquid tube having an outlet along its side, a wiper member comprising a sheet of rubber or the like wrapped around said liquid tube and having its sides extended and brought together to present a pair of adjacent wiping edges, and a holder clamping said wiper sheet around said tube and holding its extended sides in contact.

In witness that I claim the foregoing I have hereunto subscribed my name this 7th day of November, 1929.

CLARENCE B. WILLIAMS.